United States Patent Office 3,840,456
Patented Oct. 8, 1974

3,840,456
PRODUCTION OF LOW-SULFUR FUEL FROM SULFUR-BEARING COALS AND OILS
Paul M. Yavorsky, Monongahela, and Sam Friedman and Sayeed Akhtar, Pittsburgh, Pa., assignors to the United States of America as represented by the Secretary of the Interior
Filed July 20, 1972, Ser. No. 273,667
Int. Cl. C10g 1/06
U.S. Cl. 208—10                                          8 Claims

ABSTRACT OF THE DISCLOSURE

Coal, lignite, oils, etc. are desulfurized by rapidly passing a fluid stream of the feedstock through an immobilized bed reactor, in the presence of a catalyst, under heat and pressure, while a reducing gas is simultaneously flowing through the reactor at substantially above turbulent flow velocity.

---

In the not-too-distant future, there will be shortages of low-sulfur coal in parts of the United States. As such, more and more high-sulfur-coal will have to be employed as fuel in power generating stations. In view of the potential pollution from the consumption of high-sulfur coal, either the high-sulfur coal will have to be desulfurized or the oxides of sulfur will have to be removed from flue gases.

Sulfur occurs in two principal forms in coal: pyritic and organic. Pyritic sulfur may be removed by a number of physical benefication methods if the coal is amenable to pyrite liberation by grinding. However, most coals are not amenable, and, in any event, the organic sulfur is not affected by physical benefication. Thus, the concentration of residnual sulfur in coal processed by physical benefication may still be too high to meet existing and projected air pollution regulations. Furthermore, most of the presently known benefication methods are uneconomic and wasteful of coal if applied for thorough pyrite removal.

Toward this end, we have now discovered a new and improved process for desulfurizing carbonaceous materials such as coal. Both pyritic and organic sulfur are removed. Broadly, the invention comprises rapidly passing a fluid stream of the raw material through a packed or immobilized bed of desulfurization-cracking catalyst pellets while simultaneously passing a reducing gas through the bed at a velocity substantially above turbulent flow. The combination of turbulent flow and an immobilized reactor bed of catalyst pellets maintains continuously active and rapid desulfurization conditions, and minimizes liquefaction consumption of the reducing gas. Most of the resultant product is soluble in benzene. As used throughout the specification and claims, the benzene-soluble fraction is termed "fuel oil product" and may be either liquid or solid at ambient temperature. Such fuel oil product is made up of a higher molecular weight "asphaltene" fraction which is insoluble in hexane, and a lower molecular weight oil fraction which is soluble in both benzene and hexene. That fraction of the product which is insoluble in benzene is termed "residue" or "benzene insolubles."

Besides desulfurizing coal, the process is also suitable for desulfurizing lignite, coal extracts, lignite extracts, shale oil, oil from tar sands, raw petroleum, petroleum fuel oils, and petroleum distillation residuals (e.g., asphalt). If the raw material is a solid such as particulate coal, the feed stock stream may be formed by slurrying the raw material with a slurry oil or organic liquid. Very viscous raw materials may require oil-base or organic diluents to form a sufficiently fluid feedstock stream at the operating conditions.

Additionally, the fixed reactor bed need not be catalytic if natural ash materials in the feedstock stream are sufficiently catalytic. Alternatively, the fixed bed need not be catalytic if catalytic materials in suspension or solution are added to the feedstock. Under these circumstances an inert bed of pellets is employed to provide, in combination with the gas flow, the necessary reaction-promoting turbulence to the flowing fluids.

It is therefore an object of the present invention to rapidly desulfurize bituminous and petroleum materials such as coals of all grades, coal derivatives, lignite, crude petroleum and petroleum derivatives, etc., while minimizing and liquefaction to minimize consumption of the reactive gas added.

Yet another object is to rapidly upgrade oil from oil shale and tar sands, that is, reduce sulfur, oxygen, and nitrogen contents by the same reaction system.

Another object is to rapidly pass a reducing gas and a slurry of sulfurous bituminous solid materials or a stream of sulfurous liquid fuel through a fixed-bed catalytic reaction zone.

A further object is to avoid deposition and plugging in a catalytic desulfurization zone while maintaining catalytic activity.

A still further object is to desulfurize any of the sulfur-bearing materials mentioned above by rapidly passing them and a reducing gas through a fixed-bed of inert particles, whereby the reaction is promoted by the combined effects of turbulent flow plus whatever catalytic materials are indigenously present in or added to the feed materials.

Other objects and advantages will be obvious from the following more detailed descriptions of the invention taken in conjunction with the drawings in which.

Figure 1:
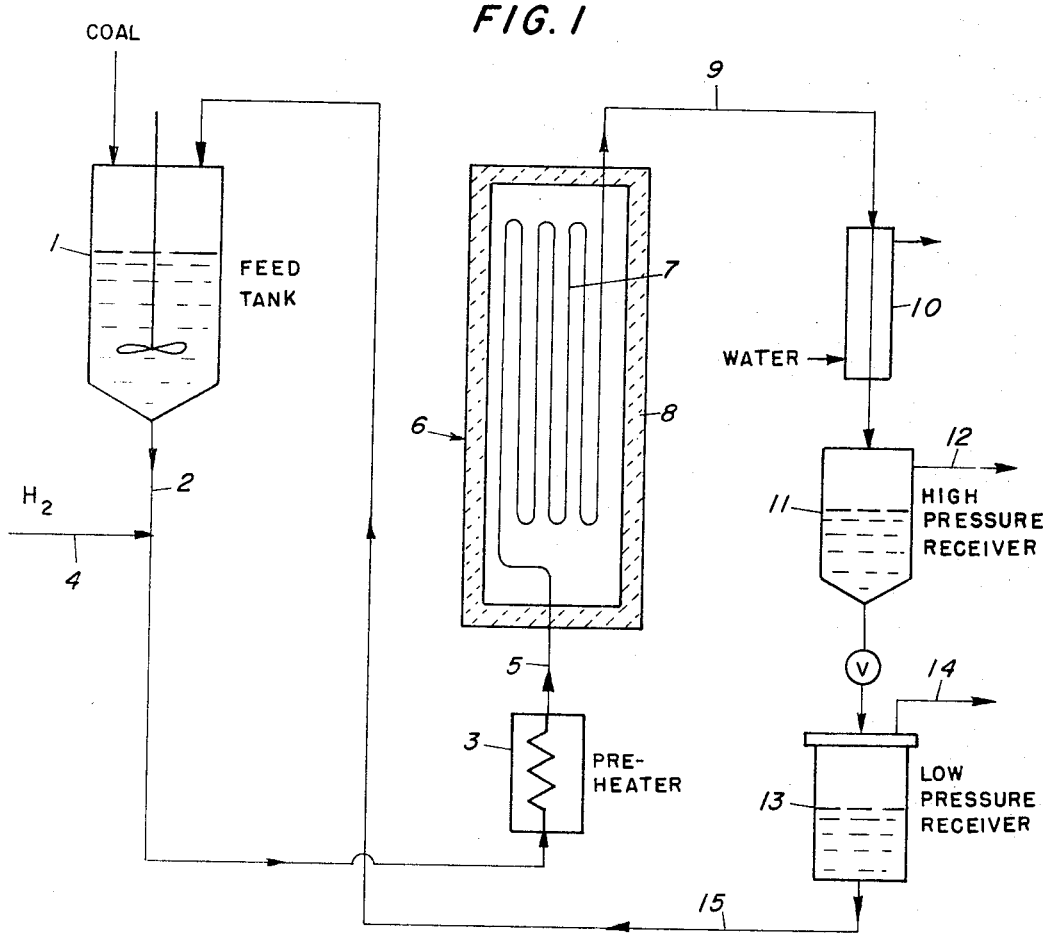
FIG. 1 is an exemplary system for carrying out the invention.

In the practice of the present invention, reaction conditions in the catalytic reactor broadly include a temperature of about 300–500° C., preferably 400–460° C., and a pressure of about 500–40,000 p.s.i.g., preferably about 1500–4500 p.s.i.g.

The packed or immobilized catalyst bed is generally composed of alumina pellets impregnated with cobalt and molybdenum, or nickel and molybdenum, with or without silica; alumina pellets impregnated singly or with combinations of tin, zinc, tungsten, cobalt, molybdenum, bismuth, iron and nickel; iron pellets having variously oxidized or sulfided surfaces.

Preferred catalysts are alumina pellets impregnated with cobalt and molybdenum also containing silica, and alumina pellets impregnated with nickel and molybdenum. Such catalysts are commercially available.

Void space in the catalytic reactor is generally about 20–80%, preferably 40–60%.

Catalyst size generally varies from about .1–25 mm., preferably about .1–10 mm. Any catalyst shapes can be employed. Preferably the shapes are cylinders or spheres.

Inert packed beds generally consist of glass beads, silica sand or stainless steel particles of the same size range as above.

With regard to the rate of flow of the feedstock stream to and through the reactor, it is generally about 50 to 1000 pounds per hour per cubic foot of void space in the reactor, preferably about 150 to 300 pounds per hour per cubic foot.

When the raw material to be desulfurized is a solid such as coal, the particle size is broadly 12 mesh to less than 400 mesh (U.S. Standard Sieve), preferably whole minus 100 mesh without fines removal. The slurrying liquid employed to form the feedstock stream can be any organic liquid which is stable at the operating conditions, or any hydrocarbonaceous liquids such as those heretofore employed in the art of hydrocracking coal slurrys. Exemplary liquids include tar, anthracene oil, heavy petroleum oil or recycled product oil made from the feed material to this process. The slurry concentration (wt. coal/wt. liquid) is generally about 0.01–0.60, preferably about 0.2–0.5.

As to the reductive gas in the process, it is preferably hydrogen but can also be CO, mixtures of $H_2$+CO, and CO+steam. Flow rates of the gas are generally 10–2000 s.c.f./# feedstock stream, preferably 20–200 s.c.f./# feedstock. As indicated previously, the gas flow rate must be at a velocity substantially above turbulent flow; that is, the modified Reynold's number, $N_{Re'}$ (assuming for calculational purposes that the gas is essentially the only medium flowing through the voids of the reactor bed), is substantially greater than 100, as this number is defined in "Perry's Chemical Engineers Handbook," McGraw-Hill, New York, 4th ed., 1967, pp. 5–50, 5–51. Generally, $N_{Re'}$ should be >100, preferably >500.

The operating conditions insure that as little of the reductive gas as possible is consumed during the desulfurization reaction by virtue of very rapid flow through the reactive zone. Unconsumed reductive gas can be recovered from the product gas in the prior art manner, and recycled to the reactor.

The main reaction product is liquid at reaction conditions. At room temperature and pressure, the product is usually a liquid but, depending on specific feedstocks and operating conditions, can be a semi-liquid or low-melting point solid. Its sulfur content is substantially less than .5% and it is suitable as a low-sulfur fuel, predominantly for electric generating plants. If desired, the benzene-insolubles, including ash in the product, can be separated out by conventional separating techniques such as centrifugation, hydraulic cyclones, direct filtration, solvent extraction, etc. In the case of coal desulfurization, after benzene-insolubles and ash are removed, a part of the fuel oil product can be recycled as the slurry vehicle for fresh coal. Similarly, if the raw material is a very viscous liquid, a part of the fuel oil product may be recycled as diluent.

Most of the sulfur which is removed from the feed in the reactor is in the form of $H_2S$ in the off-gas, which $H_2S$ can be collected by established technology and transformed to elemental sulfur in a conventional Claus plant.

The following example illustrates the process of the present invention which may also be practised at much larger scales basically using the same principles.

Hvb bituminous coal ground to pass 100% through 100 mesh (U.S. Standard Sieve) and 70% through 200 mesh, and containing 3.4% sulfur, was slurried (30 wt. pct. coal) with tar in feed tank 1 as shown in the drawing. The tar came from high-temperature coke of metallurgical-grade bituminous coal, and contained .6% sulfur. Conduit 2 conveyed the slurry at 5 lb./hr. to preheater 3. A pump (not shown) in conduit 2 brought the slurry to operating pressure. Hydrogen at 500 s.c.f.h. at operating pressure was fed by conduit 4 to mix with the slurry.

In preheater 3, the mixture was heated to the reaction temperature, 450° C., and immediately thereafter conveyed by conduit 5 into the bottom of catalytic reactor 6. The reactor consisted of a 68-foot length of 5/16-inch ID high-pressure stainless steel tube folded into 3½ hairpin loops 7 to fit inside a 10-foot by 10-inch ID vertical cylindrical furnace 8. The reactor was packed with about 2 pounds of commercially available catalyst consisting of silica-stabilized cobalt molybdate supported on alumina. The catalyst was in the form of cylindrical pellets, 1/8-inch diameter by 1/8-inch long. There was an estimated 50% interstitial void space in the reactor.

After leaving the reactor, the entire product stream was fed by conduit 9 to water-cooled heat exchanger 10 wherein the stream was cooled to about 20° C., and all the liquid products including oil, water and residual solids (the "whole" product) were collected in a high-pressure receiver 11.

Gases were removed from receiver 11 by conduit 12, depressurized and conveyed to a stack (not shown). High-pressure receiver 11 drained into a low-pressure receiver 13. Water was decanted from the top of the body of liquid product in receiver 13. Any gases in the receiver were conveyed to stack by conduit 14. Prior to analysis, liquid product in receiver 14 was conveyed through conduit 15, and recycled as feedstock through the system.

In practice, unconsumed hydrogen in gases from conduits 12 and 14 can be recycled to conduit 4 after removal of hydrogen sulfide, ammonia, and other impurities.

The system as outlined above was tested at two operating pressures, 2000 and 4000 p.s.i.g. The following Tables 1 and 2 show the results of the tests. In the tables, percentages of the "whole" product are on a water-free basis. The "feed" includes coal plus slurry tar.

TABLE 1.—ANALYSIS OF PRODUCTS

Desulfurization of a hvb bituminous coal having 3.4% sulfur, suspended (30%) in tar having 0.6% sulfur

|  | Operating pressure, p.s.i.g. | |
| --- | --- | --- |
|  | 4,000 | 2,000 |
| Results: | | |
| Sulfur in feed mixture, wt. percent | 1.41 | 1.41 |
| Sulfur in whole product, wt. percent | 0.30 | 0.42 |
| Yield of whole product, wt. percent of feed | 94.0 | 92.9 |
| Viscosity of whole product, SSF at 180° F | 11.5 | 20.1 |
| Yield of fuel oils,[1] wt. percent of whole product | 91.2 | 87.1 |
| Sulfur in fuel oils,[1] wt. percent | 0.09 | 0.14 |
| Residue (ash plus organic), wt. percent of whole product | 8.8 | 12.9 |
| Sulfur in residue, wt. percent | 2.91 | 1.88 |
| Gaseous hydrocarbons, wt. percent of feed | 1.4 | 1.4 |
| Solvent analysis of whole product, wt. percent: | | |
| Oil (hexane-soluble) | 82.1 | 69.2 |
| Asphaltene | 9.1 | 17.9 |
| Benzene-insoluble residue | 8.8 | 12.9 |
| Elemental analysis (ash-free basis), wt. percent: | | |
| Carbon | 90.4 | 92.3 |
| Hydrogen | 7.8 | 6.5 |
| Nitrogen | 0.4 | 0.8 |
| Sulfur | 0.30 | 0.42 |
| Oxygen (by difference) | 1.1 | 0.0 |

[1] Fuel oils defined as the hexane-soluble oil fraction plus the asphaltene fraction as determined by solvent analysis.

TABLE 2

Hydrogen consumption, s.c.f./100 lb. of coal

|  | Operating pressure p.s.i.g. | |
| --- | --- | --- |
|  | 4,000 | 2,000 |
| Hydrogen consumed in— | | |
| Sulfur removal ($H_2S$) | 14.9 | 14.1 |
| Nitrogen removal ($NH_3$) | 39.6 | 26.7 |
| Oxygen removal ($H_2O$) | 224.0 | 224.0 |
| Liquefaction and gas production | 345.0 | 79.3 |
| Total | 623.5 | 344.1 |

As can be seen from Table 1, about three-fourths of the sulfur has been removed from the whole product. Furthermore, it can be seen that the sulfur content of the fuel oil produced at the more economical pressure (2000 p.s.i.g.), although higher than the sulfur in the higher pressure product, is still quite acceptable as a very low-sulfur fuel. Current regulations allow 0.7% sulfur in fuels of this form.

It is further evident that the sulfur is concentrated in the benzene insolubles from the whole product, which insolubles can be separated out to further lower the sulfur content of the product. Total removal of insolubles would lead to the very low sulfur contents of the "fuel oils" defined in Table 1, namely 0.09 and 0.14% for the respective operating pressures of 4000 and 2000 p.s.i.g. Additional tests have indicated that the sulfur in the benzene insolubles was mainly derived from the slurry tar. Accordingly, the use of an essentially sulfur-free slurry liquid would obviously significantly lower the sulfur content of the "whole" product.

Referring to Table 2, it can be seen that at the lower operating pressure, the amount of hydrogen consumed for liquefaction and gas production is less than the amount consumed for N, O, and S removal.

Figure 2:
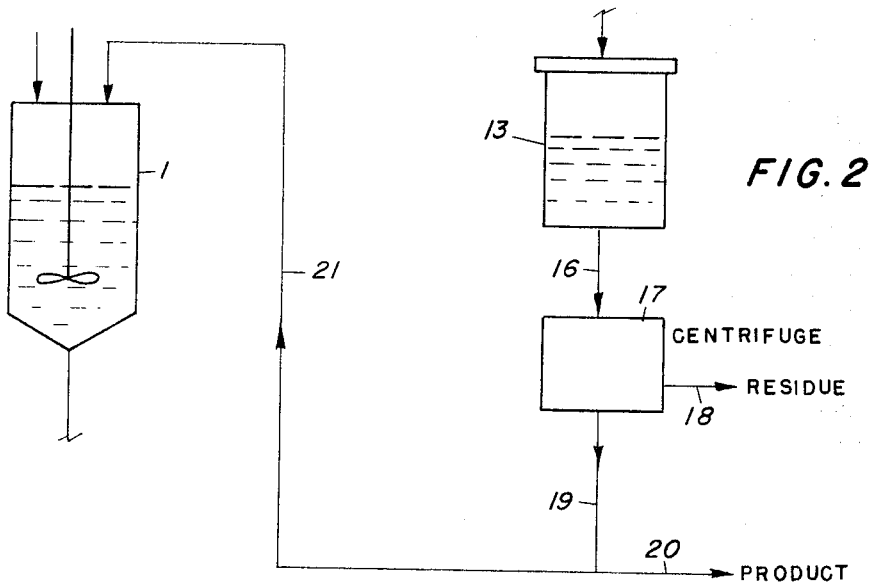
FIG. 2 is an alternative embodiment.

In addition to the simple operation with tar as vehicle for feed coal, the process has also been specifically tested with use of a recycled portion of the product oil as the coal slurrying vehicle. This makes the process self-supporting, requiring no feed materials except the coal or other material to de desulfurized. This modification is illustrated in FIG. 2. Conduit 16 transfers liquid product from receiver 13 to continuous centrifuge 17. Solids residue exist via conduit 18 to disposal by distillation, carbonization, combustion or gasification to produce hydrogen for this process. Centrifuged liquid, now having less solids, passes through conduit 19 which stream is split into a final product stream in conduit 20 and a recycled portion in conduit 21. Centrifuging of recycle oil is desired to reduce the amount of solids fed back into the reactor.

Conditions and results of a typical test of the modified system of FIG. 2 with recycled vehicle oil are shown in Table 3. The basic equipment was essentially the same as that described in FIG. 1.

TABLE 3

Results of hydrodesulfurization of a hvb bituminous coal in recycle oil with centrifuging Conditions:
    Catalyst: silica-promoted cobalt molybdate
    Temperature: 450° C.
    Pressure: 2,000 p.s.i.g.
    Liquid feed: 30 coal+70 recycle oil (wt. pct.)
    Liquid feed throughput: 140 lb./hr./ft.$^3$ reactor volume
    Hydrogen throughput: 500 s.c.f./hr.

Gross Results:
| | |
|---|---|
| Sulfur in feed coal, wt. pct. | 3.00 |
| Sulfur in recycled oil, wt. pct. | 0.31 |
| Sulfur in feed slurry, wt. pct. | 1.12 |
| Sulfur in centrifuged oil product, wt. pct. | 0.31 |
| Actual yield of centrifuged product, wt. pct. of feed | 83.0 |
| Viscosity of product oil, SSF at 180° F. | 75–204 |
| Specific gravity, 60° F. | 1.13 |
| Calorific value, B.t.u./lb. | 16,800 |

Analyses of centrifuged product oil:

Solvent analysis, wt. pct.:
| | |
|---|---|
| Organic benzene insolubles | 11.6 |
| Ash | 1.3 |
| Asphaltene | 24.4 |
| Oils (pentane soluble) | 62.7 |

Elemental analysis (ash-free basis), wt. pct.:
| | |
|---|---|
| Carbon | 89.6 |
| Hydrogen | 7.6 |
| Nitrogen | 0.9 |
| Sulfur | 0.31 |
| Oxygen (by difference) | 1.6 |

Analysis of centrifuge residue (9.5% of raw product) (solvent analysis, wt. pct.)
| | |
|---|---|
| Organic benzene insolubles | 33.1 |
| Ash | 27.7 |
| Asphaltenes | 9.0 |
| Oil | 30.2 |
| Sulfur content, wt. pct. | 2.10 |

It is clear from Table 3 that residual sulfur concentrates in the centrifuge residue, so that the product oil from the centrifuge has less sulfur than the raw product oil.

To demonstrate the exceptional efficacy of this process, data are presented in the following Table 4 for a test of desulfurization-liquefaction of a very high-sulfur coal processed in essentially the same manner and apparatus as the feedstock of the test shown in Table 3.

TABLE 4

Results of hydrodesulfurization of a hva bituminous coal in recycle oil with centrifuging Conditions:
    Catalyst: silica-promoted cobalt molybdate
    Temperature: 450° C.
    Pressure: 4000 p.s.i.g.
    Liquid feed: 45 coal:55 recycle oil (wt. pct.)
    Liquid feed throughout: 140 lb./hr./ft.$^3$ reactor volume
    Hydrogen throughput: 125 s.c.f./hr.

Gross Results:
| | |
|---|---|
| Sulfur in feed coal, wt. pct. | 4.60 |
| Sulfur in recycled oil, wt. pct. | 0.19 |
| Sulfur in feed slurry, wt. pct. | 2.17 |
| Sulfur in centrifuged product oil, wt. pct. | 0.19 |
| Viscosity of product oil, SSF at 180° F. | 21–30 |
| Calorific value of product oil, B.t.u./lb. | 17,700 |

Analyses of centrifuged product oil:

Solvent analysis, wt. pct.:
| | |
|---|---|
| Oil (pentane soluble) | 79.5 |
| Asphaltene | 17.4 |
| Organic benzene insolubles | 2.1 |
| Ash | 1.0 |

Elemental analysis (ash-free basis), wt. pct.:
| | |
|---|---|
| Carbon | 89.9 |
| Hydrogen | 9.2 |
| Nitrogen | 0.6 |
| Sulfur | 0.19 |

As can be seen from Table 4, low-value coal, having 4.6% sulfur, was converted into a high-value fuel oil having only 0.19% sulfur. Also, the coal had an ash content of 17% whereas the product oil had only 1.0% ash.

It is believed that the combination of high turbulence and a fixed-bed catalyst has a multifold effect on the process. More specifically, the turbulence naturally enhances suspension of solids to overcome plugging. Additionally, it prevents "hot spots" which normally lead to carbonization and plugging. Still further, turbulence erodes the sheath of carbonaceous material that might otherwise shield the catalyst and rapidly render it inactive. Even further, turbulence improves gas-liquid contacting which accelerates mass transfer of the gas reactant into the liquid, thereby accelerating the desulfurization reaction so that short reactor times suffice.

We claim:

1. A process for desulfurizing coal comprising passing a fluid stream of the coal in a liquid slurry through a reactor containing an immobilized bed of catalyst particles, said bed having an interstitial void space of about 20–80% and said catalyst being a desulfurization catalyst from the group consisting of a cobalt molybdate supported on alumina, silica-stabilized cobalt molybdate supported on alumina and nickel molybdate supported on alumina, wherein said stream is passed to and through said bed at a rate of about 50 to 1000 pounds per hour per cubic foot of void space in said bed; wherein the reaction conditions in the bed are about 300–500° C. and 500–40,000 p.s.i.g.; simultaneously passing a reducing gas through said bed, said reducing gas selected from the group consisting of hydrogen, carbon monoxide, steam and mixtures thereof, said gas flow rate being about 10–2000 s.c.f./pound of said stream and at a velocity substantially above turbulent flow, the modified Reynold's number, $N_{Re'}$ of said gas flow rate being at least 100; and removing a liquid fuel oil product from said reactor.

2. The process of claim 1 wherein said void space is about 40–60%, said stream flow rate is about 150 to 300 pounds per hour per cubic foot of void space, said temperature is about 400–460° C., said pressure is about 1500–4500 p.s.i.g., said gas flow rate is about 20–200 s.c.f./pound of said stream, and said Reynold's number is at least 500.

3. The process of claim 1 further including separating benzene-insolubles from said liquid product to form a fuel oil product of reduced ash content and reduced sulfur content.

4. The process of claim 1 wherein the slurry liquid is selected from the group consisting of tar, anthracene oil, heavy petroleum oils, and said liquid product.

5. The process of claim 1 wherein said slurry has a coal concentration of about 0.01–0.60 parts of coal per part of slurry liquid.

6. The process of claim 1 wherein said coal has a particle size of about 12 to less than 400 mesh.

7. The process of claim 6 wherein the particle size of said coal is reduced so that all of it will pass through a 100 mesh screen.

8. The process of claim 7 wherein unconsumed hydrogen from said reactor is recycled back to said reactor.

References Cited
UNITED STATES PATENTS

| | | | |
|---|---|---|---|
| Re. 25,770 | 4/1965 | Johanson | 208—10 |
| 1,934,023 | 11/1933 | Wright | 208—10 |
| 3,527,691 | 9/1970 | Hodgson | 208—10 |
| 3,594,305 | 7/1971 | Kirk | 208—10 |
| 3,617,474 | 11/1971 | Stotler | 208—10 |
| 3,635,814 | 1/1972 | Rieve | 208—10 |
| 3,575,847 | 4/1971 | Sprow et al. | 208—10 |

DELBERT E. GANTZ, Primary Examiner

V. O'KEEFE, Assistant Examiner

U.S. Cl. X.R.

208—8